United States Patent
Weissflog

(10) Patent No.: US 9,262,436 B2
(45) Date of Patent: Feb. 16, 2016

(54) ONLINE GAME SYSTEM AND METHOD

(75) Inventor: Andre Weissflog, Schwarzenberg (DE)

(73) Assignee: BIGPOINT GMBH, Hamburg (DE)

( * ) Notice: Subject to any disclaimer, the term of this patent is extended or adjusted under 35 U.S.C. 154(b) by 215 days.

(21) Appl. No.: 13/483,114

(22) Filed: May 30, 2012

(65) Prior Publication Data
US 2013/0275542 A1 Oct. 17, 2013

(30) Foreign Application Priority Data

Apr. 11, 2012 (EP) ..................................... 12163815

(51) Int. Cl.
*G06F 15/167* (2006.01)
*G06F 17/30* (2006.01)
*H04L 29/08* (2006.01)

(52) U.S. Cl.
CPC .......... *G06F 17/30194* (2013.01); *H04L 67/06* (2013.01); *H04L 29/08783* (2013.01)

(58) Field of Classification Search
CPC ....... G06F 17/30; G06F 12/00; G06F 12/121; G06F 12/122; G06F 13/00; G06F 15/16; G06F 17/30867; H04L 29/08783; H04L 29/06034; H04N 21/262; H04N 21/4782; H04N 7/17318; H04N 21/222
USPC ......... 709/201, 203, 212, 213, 216, 226, 230, 709/231, 245
See application file for complete search history.

(56) References Cited

U.S. PATENT DOCUMENTS

| | | | | |
|---|---|---|---|---|
| 4,845,658 A | * | 7/1989 | Gifford | 709/217 |
| 5,802,292 A | | 9/1998 | Mogul | |
| 6,757,705 B1 | * | 6/2004 | Pardikar et al. | 709/203 |
| 6,959,320 B2 | * | 10/2005 | Shah et al. | 709/203 |
| 6,965,924 B1 | * | 11/2005 | Gerthe | 709/218 |
| 7,373,406 B2 | * | 5/2008 | Jones et al. | 709/226 |
| 7,908,391 B1 | * | 3/2011 | Satish et al. | 709/232 |
| 2008/0009337 A1 | * | 1/2008 | Jackson et al. | 463/16 |

(Continued)

OTHER PUBLICATIONS

Wayback Machine, definition of the word "encode" captured on Apr. 21, 2011.*

(Continued)

*Primary Examiner* — Joshua Joo
(74) *Attorney, Agent, or Firm* — Sutherland Asbill & Brennan LLP

(57) ABSTRACT

A method in an online game system is disclosed. The method comprises steps of providing a plurality of data files in a file directory of a file system, processing encoded file system information by encoding the plurality of data files and file directory information, storing the encoded file system information in a central memory device accessible by a plurality of client devices, and performing an online session in one of the plurality of client devices, the online session comprising steps of receiving a request for a data file of the plurality of data files, the request comprising request information identifying the data file, receiving at least part of the encoded information from the central memory device in a local memory device assigned to the client device, determining whether the data file requested is available in the local memory device, comprising a step of comparing the request information to the encoded information received in the local memory device, and, if it is determined that the data file is not available in the local memory device, loading the data file from the central memory device into the local memory device. Furthermore, an online game system is provided. (FIG. 1).

7 Claims, 3 Drawing Sheets

(56) References Cited

U.S. PATENT DOCUMENTS

| | | | |
|---|---|---|---|
| 2009/0100057 A1* | 4/2009 | Martone et al. .................. 707/9 |
| 2012/0303756 A1* | 11/2012 | Bolohan et al. .............. 709/217 |
| 2013/0232187 A1* | 9/2013 | Workman .............. H04L 67/06 709/203 |
| 2013/0232229 A1* | 9/2013 | Firman et al. ................. 709/219 |
| 2014/0007081 A1* | 1/2014 | McDiarmid et al. .......... 717/176 |
| 2014/0012949 A1* | 1/2014 | Meyers et al. ................ 709/217 |
| 2015/0324439 A1* | 11/2015 | Bhave ................ G06F 11/3476 707/607 |

OTHER PUBLICATIONS

European Communication pursuant to Article 94(3) EPC for European Application No. 12163815.9 mailed Nov. 11, 2013.

Balasubramaniyan, Jagadeesh et al.; "An Intelligent Cloud System Adopting File Pre-fetching;" Department of Information Technology, Madras Institute of Technology, Chennai, India; ADCONS 2011, LNCS 7135, pp. 19-27, 2012.

Balasubramaniyan, et al., Abstract "An Intelligent Cloud System Adopting File Pre-Fetching," ADCONS Proceedings of the 2011 Int'l. Conf.; pp. 19-27 (2011).

Carter, et al., "Networking Middleware and Online-Deployment Mechanisms for Java-Based Games" Transactions on Edutainment; pp. 19-32 (2009).

"JAR (file format)", Wikipedia.org Sep. 30, 2014.

Summons to Attend Oral Hearing from related European Application No. 12163815.9 (patent No. 1952 / 2650799) dated Sep. 12, 2014.

http://www.infoworld.com, Infoworld, Jan. 27, 1997 p. 19.

* cited by examiner

ONLINE GAME SYSTEM AND METHOD

CROSS-REFERENCE TO RELATED APPLICATIONS

This application hereby claims priority to European Patent Application. No. 12 163 815.9, filed 11 Apr. 2012 the disclosure of which is expressly incorporated herein by reference.

FIELD OF THE INVENTION

The present invention refers to technologies in the field of an online game system.

BACKGROUND OF THE INVENTION

For a plurality of users, an online game system provides the opportunity for collaborative online gaming. The system is provided with a communications network or communications architecture comprising a central server device and a plurality of client devices. The client devices are connectable to the central server device for data exchange, especially for the purpose of implementing an online session for collaborative gaming. Data exchange may be performed, for example, via the internet. Also, the online game system is provided with memory device for storing electronic data, such as a central memory device accessible by the central server device and the client devices. In addition, the client devices are provided with local memory device which may comprise local memory of different levels, such as a first level cache and a second level cache.

In the course of an online gaming session performed for one of the client devices from the plurality of client devices, substantial data exchange is happening between the local memory device assigned to that client device and the central memory device. Such data exchange, usually, is using a data exchange protocol such as HTTP. Especially in view of the increasing number of users, there is need for technologies optimizing processes related to the data exchange in the online game system.

SUMMARY OF THE INVENTION

It is an object of the invention to provide new technologies for optimizing the exchange of data files in an online game system, especially for reducing data traffic during online game sessions performed by client devices of the online game system.

The problem is solved by a method according to the independent claim 1. Also, an online game system according to the independent claim 10 is provided. Advantageous developments of the proposed technologies are disclosed in dependent claims.

According to one aspect of the invention, in an online game system, a method is provided, comprising steps of providing a plurality of data files in a file directory of a file system, processing encoded file system information by encoding the plurality of data files and file directory information, storing the encoded file system information in a central memory device accessible by a plurality of client devices, and performing an online session in one of the plurality of client devices, comprising steps of:

receiving a request for a data file of the plurality of data files, the request comprising request information identifying the data file, receiving at least part of the encoded information from the central memory device in a local memory device assigned to the client device, determining whether the data file requested is available in the local memory device, comprising a step of comparing the request information to the encoded information received in the local memory device, and if it is determined that the data file is not available in the local memory device, loading the data file from the central memory device into the local memory device.

According to another aspect of the invention an online game system is provided. The online game system comprises a plurality of client devices, a file system, a file directory provided in the file system, the file directory comprising a plurality of data files, a processor for processing encoded file system information by encoding the plurality of data files and file directory information, and a central memory device for storing the encoded file system information, the central memory device being accessible by the plurality of client devices. The client devices are configured to perform an online session, comprising steps of: receiving a request for a data file of the plurality of data files, the request comprising request information identifying the data file, receiving at least part of the encoded information from the central memory device in a local memory device assigned to the client device, determining whether the data file requested is available in the local memory device, comprising a step of comparing the request information to the encoded information received in the local memory device, and if it is determined that the data file is not available in the local memory device, loading the data file from the central memory device into the local memory device.

The proposed technologies comprise the idea of encoding electronic information related to the file system comprising a plurality of data files provided in a file directory. The process of generating encoded file system information comprises a step of encoding the data files provided in the file directory as well as file directory information. Preferably, the file directory information comprises structural information about the file system, for example information about subdirectories provided in the file directory and, optionally information about the hierarchy of the subdirectories in the file system. Both, the data files and the file directory information are processed for encoding, thereby generating the encoded file system information. Such encoded file system information is stored in a central memory device of the online game system which is directly or indirectly accessible by a plurality of client devices and a central server provided in the online game system. By storing the encoded file system information in the central memory device, the encoded file system information is available for loading it, at least in part, to a local memory device assigned to one of the client devices, e.g. at the time of starting an online gaming session in the client device. Once such online session is started in one or more client devices of the online game system, the encoded file system information, at least in part, can be loaded into the local memory device of the client devices for which an online session is started. By loading such electronic information into the local memory device, the information loaded is accessible by the client device to which the local memory device is assigned.

The processing of the encoded file system information and the loading of the encoded file system information, at least in part, into one or more local memory devices may be considered as being steps of a building-up process for providing a virtual file system in the online game system. In general, a virtual file system may be considered as an abstraction layer on top of a more concrete file system which, in the present case, is the file system comprising the plurality of data files in the file directory assigned to the online game system. The steps of processing the encoded file system information and storing the encoded file system information in the central memory device may be provided as part of a pre-processing procedure. In a possible embodiment, the step of loading at least part of the encoded file system information into the local memory device of one or more client devices may be part on such pre-processing procedure. The loading of the encoded file system information into the local memory device, at least in part, may be performed pro-actively. In an alternative embodiment, the loading of the encoded file system information may be preformed in response to the step of receiving a request for a data file in the client device, preferably during an online session started on the client device.

During an online session running on the client device, in response to receiving a request for a data file a step may be performed for determining whether the data file requested is available in the local memory device assigned to the client device. Such step of determining the availability of the data file in the local memory device may comprise a step of comparing request information received by the client device together with the request for the data file to the encoded file system information in the local memory device. The request information is identifying the data file for which a request was received in the client device during the online session. If, in the step of comparing the request information to the encoded file system information, in the local memory device it is determined that the data file for which the request was received is not available in the local memory device, the data file is loaded from the central memory device into the local memory device of the client device. Following, the data file is available for processing the data file, for example, in the course of the running online session.

In some mode of operation, it may be provided that, if at the time of generating the encoded file system information one or more client devices are online, i.e. an online session is running on such client devices, at least some of the encoded file system information may be transmitted to the client devices being online without storing having the encoded information stored in the central memory device before. The encoded information transmitted to the client devices may be stored afterwards and/or at the time when the transmission to the client devices is happening.

Using the encoded file system information in the course of the online session running on the client device for responding to a request for a data file will minimize data traffic between the plurality of client devices on one side and the central memory device assigned to the central server of the online game system on the other side.

In a preferred embodiment, the encoded value is processed as a hash value. There are several methods for processing a hash value which are known as such in the art. Therefore, no further explanation needs to be given herein.

According to an aspect of the invention, the step of processing the encoded file system information, for each data file of the plurality of data files, further comprises steps of compressing the data file, and processing an encoded value for the compressed data file. Further, a step may be provided for linking the encoded value processed for each of the data files with file directory path information comprising, for example, information about the name of a subdirectory where the respective data file is provided in the file directory of the file system. The linking may be performed as a step of assigning the encoded value, which for example may be processed as a hash value, to the file directory path information.

In one embodiment, the file directory is provided with a plurality of subdirectories, and the step of processing the encoded file system information, for each subdirectory of the plurality of subdirectories, further comprises steps of processing a subdirectory content file comprising the encoded value of each data file provided in the subdirectory, compressing the subdirectory content file, and processing an encoded value for the subdirectory content file. One or all data files of the plurality of data files in the file directory may be provided in one of the subdirectories. Of course, one or more data files may also be provided in the root directory of the file directory. If additional information is assigned to the encoded value of each data file, for example, the file directory path information, such information, together with the encoded value, is provided as part of the subdirectory content file. Therefore, in the subdirectory content file there may be a listing of the encoded values each of which is assigned to additional information referring to the data file, for example, file directory path information. For such directory content file the encoded value is processed after compression. In a preferred embodiment, for each subdirectory, the encoded value for the subdirectory content file, which may be processed as a hash value, may be linked to additional information referring to the respective subdirectory, for example, subdirectory name information.

In a preferred embodiment, the step of processing the encoded file system information further comprises steps of, for each subdirectory of the plurality of subdirectories, processing a directory content file comprising the encoded value processed for the subdirectory content files, for each subdirectory of the plurality of subdirectories, compressing the directory content file, and providing a root directory key by processing an encoded value of the compressed directory content file. If additional information is assigned to the encoded values for the subdirectory content files, such additional information is part of the directory content file which is compressed afterwards. Finally, the root directory key is generated by processing an encoded value, which may be generated as a hash value, for all the compressed directory content files.

According to a further embodiment, the step of receiving at least part of the encoded information comprises a step of receiving, in the local memory device, at least one of the following: the encoded value for one or all data files, the encoded value for one or all subdirectory content files, and the root directory key. In a preferred embodiment, at least the root directory key is pro-actively transmitted to the local memory device when an online session is started in the client device to which the local memory device is assigned. The term "pro-actively" as used herein refers to a step of loading the respective information or data into the local memory device without having received a request for such information or data from the client before.

In still a further embodiment, the step of receiving the request for the data file comprises steps of receiving data file name information for the data file, and receiving data file directory path information indicating a directory path assigned to the data file in the file directory.

According to a preferred embodiment, the step of determining whether the data file requested is available in the local memory device comprises a step of determining the encoded value for the data file requested from the encoded information by comparing at least one of the data file name information and the data file directory path information to the encoded information. The encoded value processed for the data file requested is revealed by the client device by comparing the request information received together with the request for the data file in the client device to the encoded information provided in the local memory device assigned to the client device. For example, if both the request information and the encoded information loaded locally comprise information about the name and/or a directory path assigned to the data file requested, from comparing such information the encoded value for the data file may be identified.

In another preferred embodiment, the step of loading the data file from the central memory device, in the client device, comprises steps of receiving the data file, processing a locally processed encoded value of the data file, and storing the data file and the locally processed encoded value in the local memory device. The locally processed encoded value represents the data file actually stored in the local memory device. In a preferred embodiment, whenever a data file is loaded into the local memory device, the locally processed encoded value is generated. This will ensure that the locally processed encoded value represents information on the actuality of the data file locally stored. Therefore, for example, it is not necessary to have expiration information with respect to the data files in the local memory device provided.

According to an aspect of the invention, there is further a step of comparing the encoded value determined to the locally processed encoded value. The comparison of the locally processed encoded value and the encoded value determined in the process of comparing the request information to the encoded file system information provided in the local memory device at least implicitly may provide an up-to-date test for the data file in the local memory device. Since the encoded value for the data file was revealed from the encoded tile system information loaded to the local memory device, for example, during the running online session, such encoded value represents up-to-date information for the data file requested. On the other hand, in the local memory device there may be an older version of the data file stored. For example, the data file may be received during an earlier online session. In such case, the locally processed encoded value will represent the old version of the data file. Therefore, there will be a mismatch between the encoded value and the locally processed value. In response to such mismatch information, an up-to-date version of the data file requested in the request received by the client device may be loaded from the central memory device to the local memory device. However, in a preferred embodiment, if it is found that the data file locally stored is up-to-date, in response to the request for the data file, there is no need to load the data file form the central memory device. As can be seen from the above, just by comparing encoded information the up-to-data data file can be made available for the presently running online session on the client device in the online game system.

In its different embodiments the proposed technologies may provide one or more of the following advantages over the art. A virtual read-only file system using the standard open/read/(write)/close paradigm, for example, as a virtual HTTP file system. It can be used as a drop-in replacement for conventional file Input/Output without changing high level code. There is only need for a basic data protocol such as HTTP protocol; there are no additional server-side requirements. Asynchronous, multithreaded operations may be used for reducing average latency and making optimal use of available bandwidth. Transparent file compression can be used in order to make better use of available bandwidth without additional server overhead. Directory-listing and file-exists-check capabilities can be provided without server-roundtrips or additional server-side extensions. A file-granular, hierarchical local cache can be established to dramatically reduce data traffic, even down to no HTTP traffic at all if cache is up-to-date.

A version-stamping mechanism may be established instead of tile-expiration check for cache-hit check. A client-side tampering-protection can be provided using encoded values (e.g. checksums); a negative check-hit test may occur if a cached file has been tampered with, causing a fresh download. Finally, in a preferred embodiment, using the standard HTTP protocol through standard HTTP servers for downloading static data has the advantage that use can be made of existing optimizations both in the HTTP server (like caching static files in RAM), and the existing network infrastructure (e.g. making efficient use of Content Delivery Networks).

DESCRIPTION OF THE FIGURES

In the following, the invention will be described in further detail by way of example, with reference to different embodiments. In the figures show:

Referring to FIG. 1, an online game system comprises central network facilities 1 provided with a central server device 2, and a central memory device 3 in the embodiment shown. In addition, in the online game system there is a plurality of client devices 4.1, . . . , 4.n. The client devices 4.1, . . . , 4.n may locally be established on a computer device, e.g. a personal computer, or a mobile communication device, such as a mobile phone. The client devices 4.1, . . . , 4.n will connect to the central network facilities 1 for running an online game session. Also, client devices 4.1, . . . , 4.n are provided with a local memory device 5.1, . . . , 5.n which, preferably, is comprising two ore more memory entities which may provide several hierarchically organized cache entities.

Figure 1:
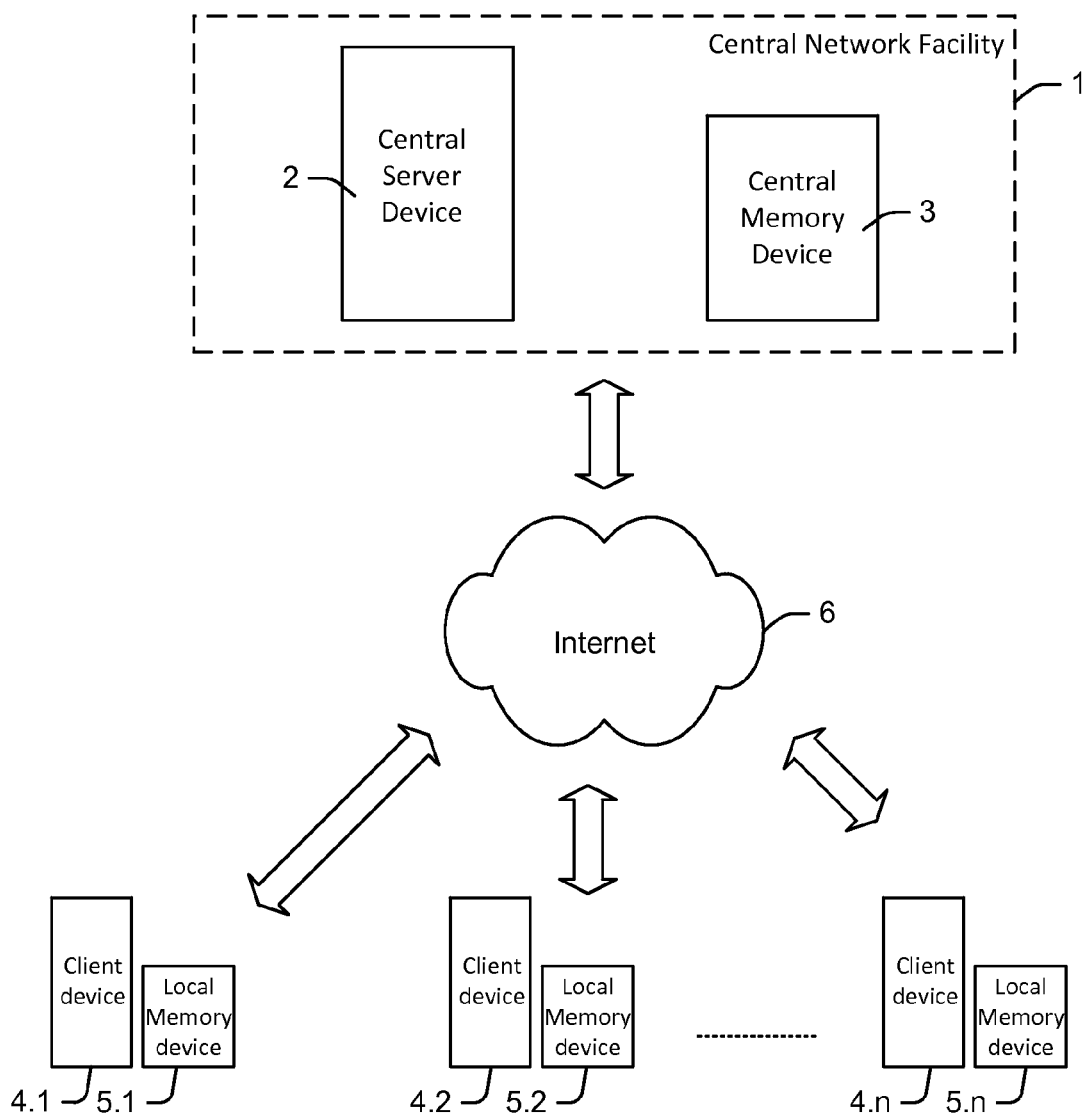
FIG. 1 a schematic representation of an online game system.

Data transfer connections between the components of the online game system will be provided permanently or non-permanently depending on different modes of operations. Data communication may be performed, for example, between the client devices 4.1, . . . , 4.n and the central network facilities 1. Also, there may be data transfer between the client devices 4.1, . . . , 4.n. In another mode of operation, the local memory device 5.1, . . . , 5.n may receive data directly from the central memory device 3. Preferably, the internet 6 (see FIG. 1) will be used as part of the data transfer connections, but, also non-public network structures may be included in establishing the data transfer connections.

Following, methods are described which may be performed in the online game system. The methods disclosed provide embodiments. The methods described may be combined by performing one or more steps of one method and one or more steps of another method. Also, additional features may be added to the processes explained. Of course, in the processes of operation of the online game system as described below features may he left out, the method left still using aspects of the invention.

In the following it is assumed that for at least some of the data exchange in the online game system the HTTP protocol is used. However, the disclosure given can be applied to other protocols as well.

In pre-processing during a build-up process of a virtual file system asset data of the central network facilities 1 comprising a plurality of data files are prepared for use with the virtual file system which preferably may be provided as a HTTP virtual file system. All data files of the asset data are located in a single file directory tree with one root directory at the top.

Figure 2:
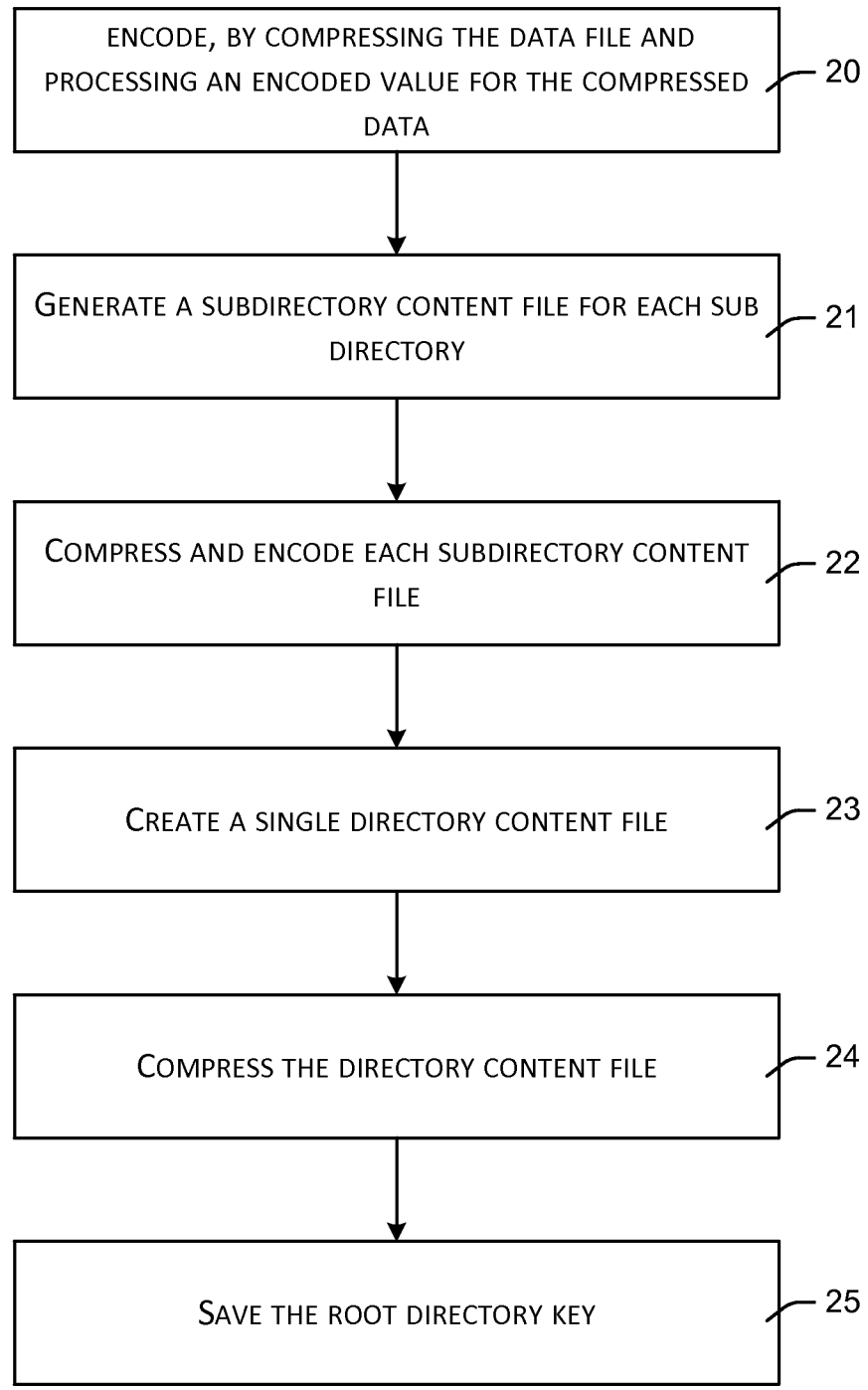
FIG. 2 a schematic block diagram for steps of setting-up a virtual file system, and FIG. 3 a schematic block diagram for steps of handling an I/O request for a data file in a client device.

Referring to FIG. 2, in a first step 20 each data file being part of asset data provided in the file directory is encoded by compressing the data file and processing an encoded value for the compressed data, e.g. a hash value. For each sub directory, a subdirectory content file which may also referred to as leaf table-of-content file is generated in a step 21. The subdirectory content file is listing the encoded values (hash values) for all data files provided in the sub directory. Also, the subdirectory content file comprises, in addition to the encoded value, file directory path information indicating a path in the file directory where the respective data file is located in the file system. For example, the data received in the subdirectory content file for a data file may be as follows: [export_win32/anims/characters]/[ancestral_guard_variations.nax3] |f| [42c87fbbfc0e108dc3ae3ab3616c0d8b] ([name of subdirectory]/[name of data file] |f| [encoded value of data file]). The pieces of information "name of subdirectory" and "name of data file" together provide a kind of path information for the data file in the file system.

Following, in step 22 each subdirectory content file is compressed and encoded like the data files of the asset data.

In a step 23, a single directory content file which may also referred to as table-of-content file is created which is listing all sub directories of the file system with its name and its encoded value processed for respective subdirectory content file. For example, the data received in the directory content file for a subdirectory may be as follows: [export_win32/anims/characters] |d| [5469bfde8f4012e4bedda397fe0282df] ([name of subdirectory] |d| [encoded value of subdirectory content file]).

Following, in step 24 the directory content file is compressed, and the encoded value (hash value) for the resulting file is computed. The single encoded value for the directory content file may be referred to as a root directory key. The root directory key is saved to a separate location in the deployment directory hierarchy accessible by the central server device (step 25).

Figure 3:
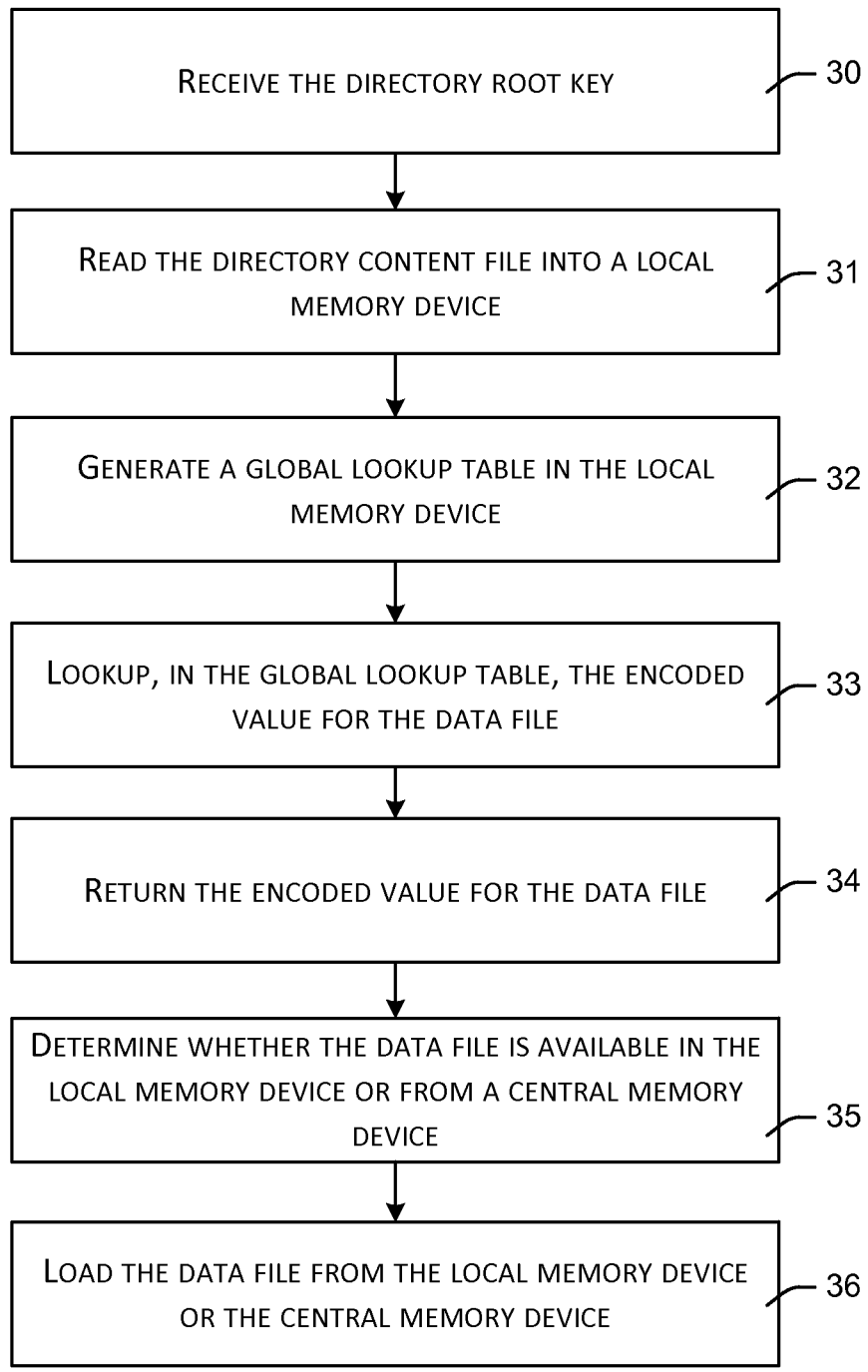

At the time of starting an online session in the client device (step 26), the following steps are performed (see FIG. 3) for finally setting-up the virtual file system. The client device receives the directory root key from the central server device in a step 30. The client device reads the directory content file into its local memory device (step 31), namely a RAM. At this point, the virtual file system is fully operational.

In a preferred embodiment, a Global Lookup Table is generated in the local memory device (step 32). It associates each data file with the file's encoded value, for example, a data file name like the file's URL with the hash value. The URL defines the location of a data file in the tile directory. The Global Lookup Table is empty at the start of the application and is filled on-demand with downloaded data from the table-of-content files.

When an I/O request for a data file identified by its data file name (e.g., URL) is received in the client device in step 33, the encoded value for the data file is looked up in the Global Lookup Table. If the URL is already in the Global Lookup Table, the encoded value for the data file requested is returned (step 34). Otherwise the subdirectory content file containing the data file requested is loaded to the client device. The data file's directory path is extracted from the data file's name. Information identifying the data file's name/encoded value is added to the key/value-pairs of the Global Lookup Table.

If, after loading (all) the subdirectory content file(s), the data file's name is still not in Global Lookup Table, the data file requested does not exist on the central device side. Following, the 10 request is cancelled by a FileNotExists error.

The I/O request now consists of the data file's name and encoded value, and it is known that the data file does exist in the file directory. Important to note, the data file name (URL) and the encoded value are unique for this version of the data file. If the data file content changes, i.e. a new version is provided the encoded value in the subdirectory content file (table-of-content-file) will change.

Next, in step 35 a "TryLoadFromCache" operation is processed. A filename is built from the data file name (URL) and the encoded value identifying the current version of the data file. It is checked if a data file with this unique name exists in the local download memory device. If yes, data the data file are loaded from the local memory device instead of downloading it from the central device. If no, an operation "TryLoadFromHttpServer" is processed instead.

The operation "TryLoadFromHttpServer" provides for a normal HTTP GET for downloading the data file from central network facilities 1 by using the URL. The downloaded data are stored into the local memory device. A memory filename is built from the data file name (URL) and the encoded value for identifying this specific version of the data file.

The I/O request received in the client device is now basically finished, and in step 36 the data file's data are loaded either from the local memory device or the central network facilities 1.

Optionally the actual encoded value of the loaded data file's data may be checked against the expected encoded value from the Global Lookup Table. If they don't match the file has either been tampered with, or there was an error during download.

Worth mentioning, the same process may take place when downloading the directory content file(s). Therefore, there is basically a recursive process with at most two recursion steps (data file->subdirectory content file->directory content file/directory content file).

The technology provided implements a hierarchical file-granular caching system on a fast local read/write storage device which dramatically reduces HTTP traffic (down to no HTTP traffic at all) and prevents client-side file tampering. The caching system implements the following features:

- does not use an expiration date like traditional browser caches, but an encoded hash of the file content to check whether a file in the cache is up-to-date
- uses table-of-content files generated at build-time to associate encoded hashes with filenames and to prevent unnecessary HTTP server roundtrips
- no HTTP requests at all if the cache is up-to-date
- prevents file-tampering by examining whether the actual content of a file in cache is identical with the server-side file by checking the actual encoded hash of a file against the expected encoded hash
- data files in the cache are named as their encoded hash value
- data files in the cache are compressed (reducing cache size and increasing pre-received data throughput of the hard disc)
- subdirectory content files are cached just as other data files.

A cache hit is defined as one of: (i) a data file named like the encoded value of the tested data file does exist in the cache, and (ii) the actual content of this data file must match the expected (build-time) encoded value. In case of a cache-hit, the I/O request is fulfilled completely from the local cache assigned to the client device, otherwise a request, e.g. an HTTP request, will be issued which fetches the complete data files from the central server device into the local memory device, namely into the RAM and into the local file system cache assigned to the client device.

A client-side tampering protection may be implemented. For each I/O request received by the client device, the actual data file content is checked against the encoded value from the subdirectory content files. If there is a mismatch, the local file system cache assigned to the client device will report a cache mismatch. Following, the data file requested will be fetched anew from the central server device, e.g. a HTTP server, and the local cache version will be overwritten with the correct version from the server. At the same time, the hash value for the data file fetched will be processed in the local memory device and stored together with the data file.

This tampering protection works for the subdirectory content files as well. Modifying the encoded values in the subdirectory content file would cause a cache mismatch when reading the subdirectory content file itself, in turn causing it to be fetched directly from the server again. Successful client-side cache-file tampering would require modifying the root directory key which is communicated to the client device directly from the central server device at start-up. The client-side tampering-protection is preferably used in conjunction with a properly secured client/server architecture, where the client isn't allowed to manipulate sensitive game state in an online session running. Especially, the client-side tampering-protection is good for preventing client-side manipulations like so-called "wall-hacks".

The encoded values may be used on the client device side as follows. Every I/O request on the client is associated with the encoded value, e.g. the hash value, of the data file before the data file is actually fetched from the server. The encoded value is used to check for a cache-hit, enable robust CDN support (see below), and finally to check whether the data file has been tampered within the local cache assigned to the client device.

There is a single root directory key communicated to the client device from the central server device at a client online session start-up. This root directory key is the encoded value of the root content file ("root table-of-content file") which contains the encoded values/keys of all subdirectory content files ("leaf table-of-content files"). Those subdirectory content tiles in turn contain the encoded values (hash values) of single data files. The virtual file system downloads subdirectory content files on demand and caches them both in RAM and in the local file system cache assigned to each of the client devices.

If a data file is requested by the file system, first a check is performed whether the associated encoded value has already been loaded from the root content file of the subdirectory where the data file is located. if not, the root content file is loaded into RAM through a normal file operation (which means, if the root content file is in the local file system cache, it will be loaded from the cache, otherwise an GET request will be performed). The required encoded value for loading the subdirectory content file ("leaf table-of-content files") is in turn looked up in the root content file ("root table-of-content file") which has been loaded at client start-up.

In a preferred embodiment, there is only a single type of HTTP requests issued by the HTTP virtual file system: HTTP GET, which fetches complete, static asset data files from the server. To make sure that an up-to-date version of a data file is downloaded when using a CDN ("Content Delivery Network"), the encoded value (checksum) of the data file is appended to the URL in a_cv tag appended to the file URL. This will cause a cache-miss and round-trip to the CDN origin server if the CDN proxy only has an outdated version of the same file (or doesn't have the data file yet at all).

The basic HTTP protocol doesn't allow listing the content of a directory, and requires an expensive server roundtrip to check whether a data file exists on the server. Both checking for the existence of a data file and listing the content of a directory are commonly used standard file system operations. The virtual file system proposed herein offers these operations by using the information from content tiles (subdirectory content files, root directory file) generated at build time. If a file doesn't exist in content file, it won't exist on the server as well, and listing the content of a directory simply means listing the content of a content file.

There may be asynchronous, parallel file operations. A single HTTP connection works serially, before a new HTTP request can be issued, the previous request must have finished. This simple single-connection-scenario has two main drawbacks:

High latency can be a serious issue for file throughput, in a high latency scenario, the connection may sit idle waiting for responses for a longer time than actually transferring data.

Large, low-priority I/O requests block small, high-priority I/O requests.

The virtual file system proposed implements a "massively multi-threaded" architecture to circumvent both problems. Instead of one HTTP request at a time, many requests can be "in flight" by distributing I/O requests across several threads, each managing its own HTTP connection. The actual number of parallel connections is tweakable.

In high-latency scenarios, this reduces the "average latency" per I/O request since a number of I/O request will wait for the response in parallel.

Traditionally, an I/O request for a data file is handled through the standardized open/read/write/close paradigm. The HTTP protocol hadn't been designed with this paradigm in mind, making it difficult to implement some common I/O concepts over HTTP in existing game engines. The virtual file system proposed herein provides the following: replacing traditional file I/O with a highly efficient, fully transparent implementation which works over HTTP and standard HTTP servers to a point where the online client can switch between HTTP I/O and "traditional" disk-based I/O without changing a single line of code.

The features disclosed in this specification, the figures and/or the claims may be material for the realization of the invention in its various embodiments, taken in isolation or in various combinations thereof.

The invention claimed is:

1. A method comprising:
providing, by an online game system comprising at least one processor, a plurality of data files in a file directory of a file system, wherein the file directory comprises at least one subdirectory;
building-up, by the online game system, a virtual file system in the online game system in a pre-processing procedure, comprising:
generating encoded file system information comprising, for each data file of the plurality of data files, compressing the data file, and processing an encoded value for the compressed data file;
generating a directory content file listing subdirectories of the file system;
compressing the directory content file;
determining an encoded value of the compressed directory content file;
storing the encoded file system information and the directory content file in a central memory device accessible by a plurality of client devices;

loading at least a portion of the encoded file system information and the compressed directory content file in a local memory device assigned to a client device of the plurality of client devices, reading the compressed directory content file at the client device; and performing, by the online game system, an online session in the client device, the performing comprising:

receiving a request for a data file of the plurality of data files, the request comprising request information identifying the data file;

determining whether the data file requested is available in the local memory device by comparing the request information to the encoded file system information and to the compressed directory content file received in the local memory device; and if it is determined that the data file is not available in the local memory device, loading the data file from the central memory device into the local memory device, the loading further comprising receiving the data file, processing a locally processed encoded value of the data file, and storing the data file and the locally processed encoded value in the local memory device.

2. The method of claim 1, wherein the file directory is provided with a plurality of subdirectories and wherein generating the encoded file system information further comprises:

processing a subdirectory content file comprising the encoded value of each data file provided in the subdirectory compressing the subdirectory content file; and processing an encoded value for the subdirectory content file.

3. The method of claim 1 wherein loading at least part of the encoded file system information comprises receiving, in the local memory device, at least one of the following:

the encoded value for one or all data files;

the encoded value for one or all subdirectory content files; and a root directory key.

4. The method of claim 1, wherein receiving the request for the data file comprises:

receiving data file name information for the data file; and receiving data file directory path information indicating a directory path assigned to the data file in the file directory.

5. The method of claim 4, wherein determining whether the data file requested is available in the local memory device comprises determining the encoded value for the data file requested from the encoded file system information by comparing at least one of the data file name information and the data file directory path information to the encoded file system information.

6. The method of claim 5, further comprising comparing the encoded value determined to the locally processed encoded value.

7. A system, comprising:

a plurality of client devices associated with an online game;

a file system;

a file directory provided in the file system, the file directory comprising a plurality of data files, wherein the file directory comprises at least one subdirectory;

a processor for processing encoded file system information comprising, for each data file of the plurality of data files, compressing the data file, and processing an encoded value for the compressed data file;

generating a directory content file listing subdirectories of the file system;

compressing the directory content file;

determining an encoded value of the compressed directory content file;

a central memory device for storing the encoded file system information and the compressed directory content file, the central memory device being accessible by the plurality of client devices, wherein the client devices are configured to perform an online session, comprising:

loading at least a portion of the encoded file system information and the compressed directory content file in a local memory device assigned to a client device of the plurality of client devices;

reading the compressed directory content file at the client device;

receiving a request for a data file of the plurality of data files, the request comprising request information identifying the data file;

receiving at least part of the encoded file system information from the central memory device in a local memory device assigned to the client device;

determining whether the data file requested is available in the local memory device, comprising a step of comparing the request information to the encoded file system information and to the compressed directory content file received in the local memory device; and if it is determined that the data file is not available in the local memory device, loading the data file from the central memory device into the local memory device, the loading further comprising receiving the data file, processing a locally processed encoded value of the data file, and storing the data file and the locally processed encoded value in the local memory device.

* * * * *